(12) United States Patent
Tsai

(10) Patent No.: US 6,459,216 B1
(45) Date of Patent: Oct. 1, 2002

(54) MULTIPLE CCFL CURRENT BALANCING SCHEME FOR SINGLE CONTROLLER TOPOLOGIES

(75) Inventor: Ying Hsien Tsai, Taipei (TW)

(73) Assignee: Monolithic Power Systems, Inc., Santa Clara, CA (US)

( * ) Notice: Subject to any disclaimer, the term of this patent is extended or adjusted under 35 U.S.C. 154(b) by 0 days.

(21) Appl. No.: 09/836,150

(22) Filed: Apr. 16, 2001

Related U.S. Application Data

(60) Provisional application No. 60/274,078, filed on Mar. 7, 2001.

(51) Int. Cl.[7] ................................................. G05F 1/00
(52) U.S. Cl. ...................... 315/294; 315/189; 315/202; 315/205; 315/291; 323/367
(58) Field of Search .......................... 315/294, 96, 98, 315/99, 101, 106, 107, 185 R, 189, 200 R, 202, 205, 291, 307, DIG. 5, DIG. 4, DIG. 2; 323/355, 367, 369, 370

(56) References Cited

U.S. PATENT DOCUMENTS 4,583,026 A * 4/1986 Kajiwara et al. ............ 313/486
5,173,643 A * 12/1992 Sullivan et al. ............. 315/276

\* cited by examiner

*Primary Examiner*—Don Wong
*Assistant Examiner*—Thuy Vinh Tran
(74) *Attorney, Agent, or Firm*—Perkins Coie LLP

(57) ABSTRACT

The multiple lamp circuit for minimizing lamp current imbalance comprises at least one transformer comprising primary windings and secondary windings. Multiple lamps are coupled in serial to the secondary windings of the transformer. Multiple separated lamp drive circuits are spliced from the transformer's secondary windings. A current balancing resistance is connected at a common node of the multiple lamps and other terminal of the current balancing resistance is connected to ground. The impedance of the current balancing resistance is relatively high compared to the ones of the multiple lamps to generate a balancing current for one of the multiple lamps, thereby resulting a current that flows through the multiple lamps is approximately equal.

16 Claims, 7 Drawing Sheets

MULTIPLE CCFL CURRENT BALANCING SCHEME FOR SINGLE CONTROLLER TOPOLOGIES

RELATED APPLICATION

The present application claims priority to U.S. Provisional Patent Application Serial No. 60/274,078 entitled "MULTIPLE CCFL CURRENT BALANCING SCHEME FOR SINGLE CONTROLLER TOPOLOGIES," filed Mar. 7, 2001, which is incorporated herein by reference.

FIELD OF THE INVENTION

The present invention relates to a multiple CCFL current balancing and sensing scheme, and specifically, to a power supply topology to deliver evenly distributed current to each CCFL in a multiple CCFL system.

BACKGROUND OF THE INVENTION

Fluorescent lamps are used to provide illumination for general lighting purposes. The critical factors in the design of a cold-cathode fluorescent lamp (CCFL) include efficiency, cost, and size. A fluorescent lamp is a low-pressure gas discharge source. The lamp contains mercury vapor at low pressure with a small amount of inert gas. The inner wall of the lamp is coated with fluorescent powder. The discharge generates visible radiation. The CCFL has efficiency in the range of 40 to 60 lumens per watt and the average life of the CCFL lasts for 10,000 hours or more.

FIG. 1 illustrates a conventional single CCFL current sensing scheme. The prior art includes a controller 2 to control the status of the CCFL. A transformer T1 is coupled to the controller 2 and a CCFL is next coupled to the secondary windings of the transformer T1. A feedback loop 4 is connected between the controller 2 and the CCFL. The power provided by the power supply is controlled by the controller to provide current tending to flow into and out of the parasitic capacitance, induction, and resistance. The controller supplies a waveform (rectangular or square) to the transformer's T1 primary windings for producing a sinusoidal voltage across T1'S secondary windings and all circuitry in parallel with the winding namely CP, C2 and the CCFL. The original drive waveform is converted to a sinusoid by the filtering action of the resonant circuits consisting of the series combination of CS and T1's primary leakage inductance and T1's secondary leakage inductance in parallel with the parallel capacitance comprising of CP in series with C2. The sinusoidal waveform is necessary to create a sinusoidal current in the CCFL. In general, the more discrete resonant circuits exist in any given topology, the greater the filtering action and a purer sinusoidal voltage waveform.

The lamp current produced by this sinusoidal voltage is also sinusoidal with no direct current flowing through the lamp, i.e., the average value of the current flowing through the lamp is zero. To maintain constant lamp intensity, the lamp current is sensed and regulated by the controller 2. The lamp intensity is adjusted by the controller using an external signal applied to the controller (brightness input). The signal may be an analog voltage or may take the form of a digital signal. Depending on the controller design, the lamp current may increase with an increase in the externally applied analog voltage or an increased duty cycle of the digital signal. This method of lamp current control is commonly referred to as "positive dimming". Conversely, the applied signal may decrease the lamp current with a decrease in input analog voltage or duty cycle. This method of lamp current control is commonly referred to as "negative dimming".

During the time when the sinusoidal input is positive with respect to the circuit common (feedback loop 4), current flows through the lamp and is rectified by D1, developing a voltage across R1 and filtered into a somewhat pure DC voltage by C1 for use by the controller. During the negative half-cycle, the lamp current is rectified by D2, completing the full cycle of lamp current flow. The terminal of the CCFL nearest the circuit common is commonly referred to as the "cold end", while the other terminal is known as the "hot end". An open-lamp circuit consists of D3, D4, CP and C2. The open-lamp circuit provides protection against hazardous voltage to operating personnel and against failure of the components experiencing high voltage.

The stray wiring leakage has a slight effect on the linearity of the lamp current verse applied voltage. Generally, the issue is not a serious problem in the single lamp circuit, but can cause more serious problems in multiple CCFL schemes. One scheme for controlling multiple CCFLs is shown in U.S. Pat. No. 6,104,146 to John Chou and Yung-Lin Lin, entitled "Balanced Power Supply Circuit For Multiple Cold-Cathode Fluorescent Lamps".

FIG. 2 shows a prior art multiple lamp circuit having two CCFLs in parallel. The system includes a controller 12 a driving circuit 14, a feedback circuit 16 and lamps CCFL1 and CCFL2. A power supply provides a voltage to the driving circuits 14 that is a self-resonating circuit. The currents that flow into the lamps are similar but not equal due to the fact that the resistance of each path is somewhat different. This scheme does not have the capability of current balancing to control the current used to supply each CCFL.

FIG. 3 illustrates another prior art multiple lamp scheme. The system includes a power supply (not shown), a controller 20, CCFL driving circuit, current balancing circuit 24, and at least two CCFLs. The driving circuit consists of two transformers T1, T2 that are connected in series with primary and secondary windings. The transformers are connected to the controller 20 via their primary windings. CCFL lamps are connected in series and a bridge rectifier D2 is coupled to a common node of the lamps to terminate and sense the lamps' current. Another bridge rectifier D1 in the driving circuit 22 is used to sense lamp-out for either or both lamps. A resistor R1 is placed at the common node of the transformers T1, T2 secondary windings. The resistor R1 is used to address a lamp-out condition. In the two lamp circuit, the transformer secondary winding currents are equal, but the lamp currents are not equal due to the difference between the amount of parasitic current diversion paths in the two lamp circuits. This issue causes a difference in the amount of current available for each lamp and a resultant mismatch. Further, even if both current paths have identical strays and parallel capacitance, the lamps' operating voltage mismatch causes the CCFL with higher operating voltage to receive less current. The higher voltage causes more current to be diverted into the parallel capacitor and strays, leaving less current to flow through the lamp. The mismatch between the two circuits also causes a lamp current imbalance. An alternative prior art is illustrated in FIG. 4, which is similar to the aforementioned two-lamp scheme. This scheme uses a single transformer with matched secondary windings.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The prior art circuits previously described fails to balance the lamp current. The present invention provides a current balancing resistance with high impedance that is connected at the common node of the CCFLs to generate a feedback current. Namely, the present invention provides means for dramatically reducing the effects of the circuit imbalances. The common node of the lamps plays the role of the potential return path for any shunt parasitic elements along the length of either lamp. In other words, the circuit common connection point inadvertently completes a circuit path for parasitic elements existing in parallel with and at the hot end of either lamp.

Figure 1:
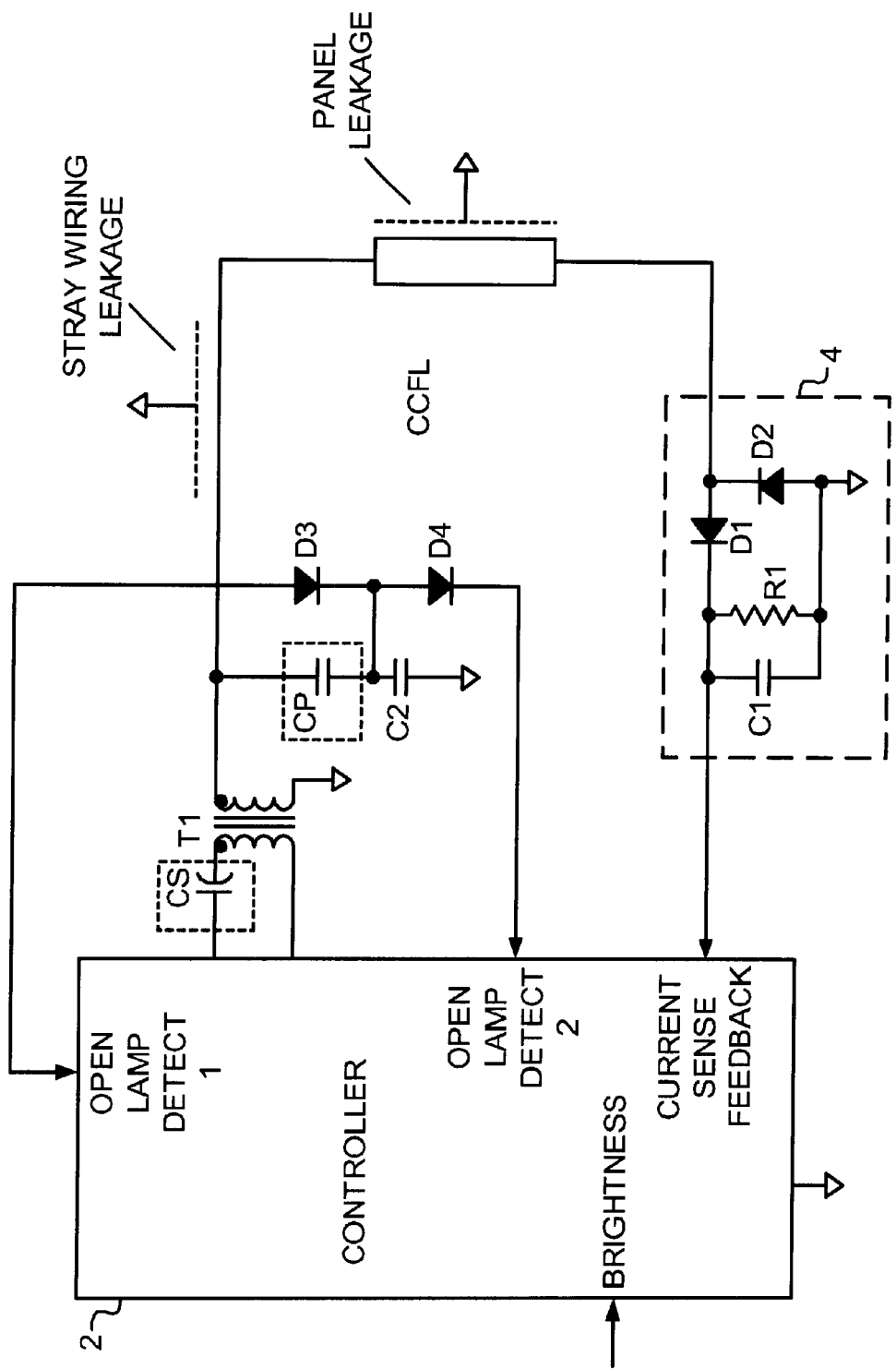
FIG. 1 is a single CCFL circuit in accordance with the prior art.
Figure 2:
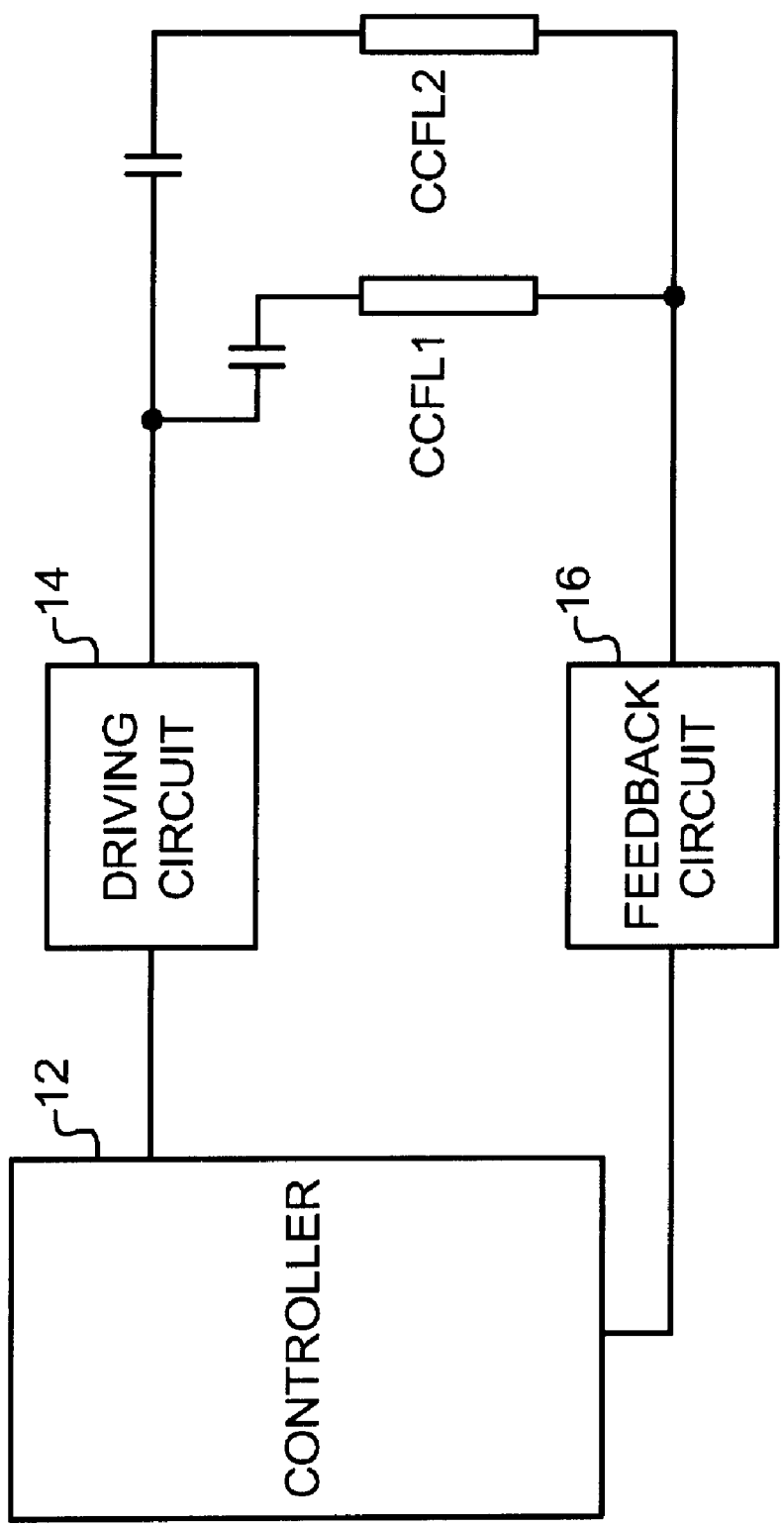
FIG. 2 is a two CCFL circuit in accordance with the prior art.
Figure 3:
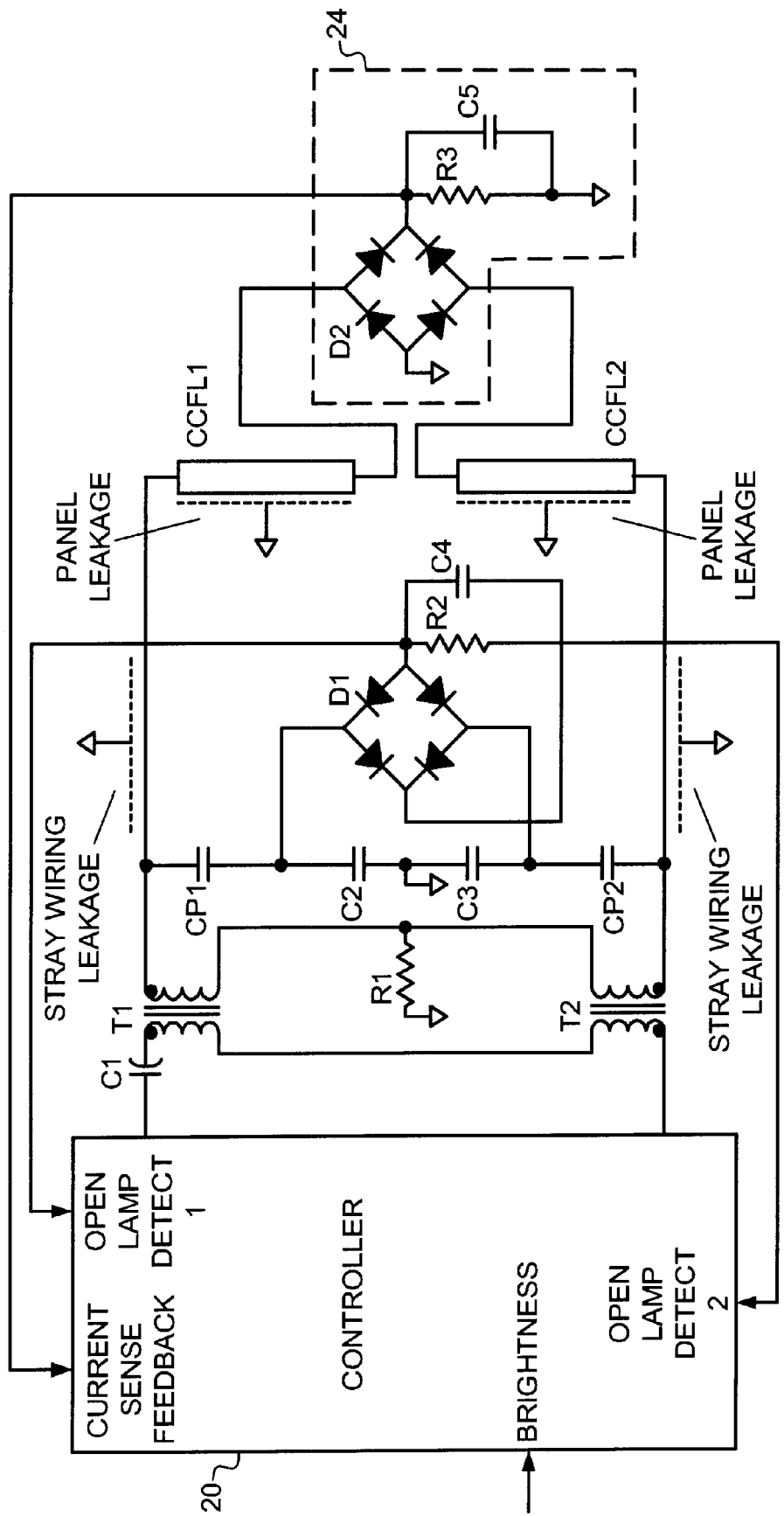
FIG. 3 is a two CCFL circuit in accordance with the prior art.
Figure 4:
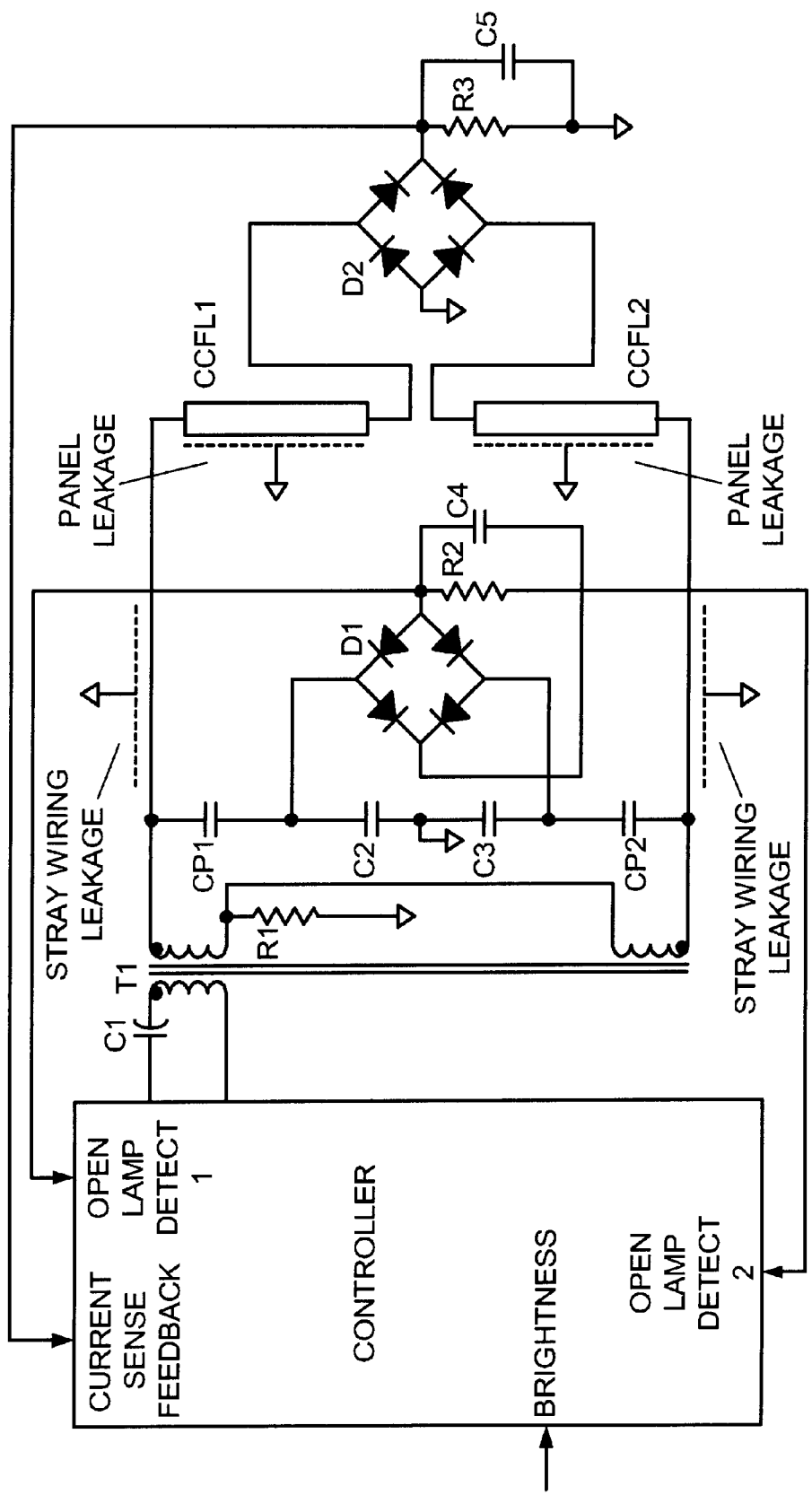
FIG. 4 is a two CCFL circuit in accordance with the prior art.
Figure 5:
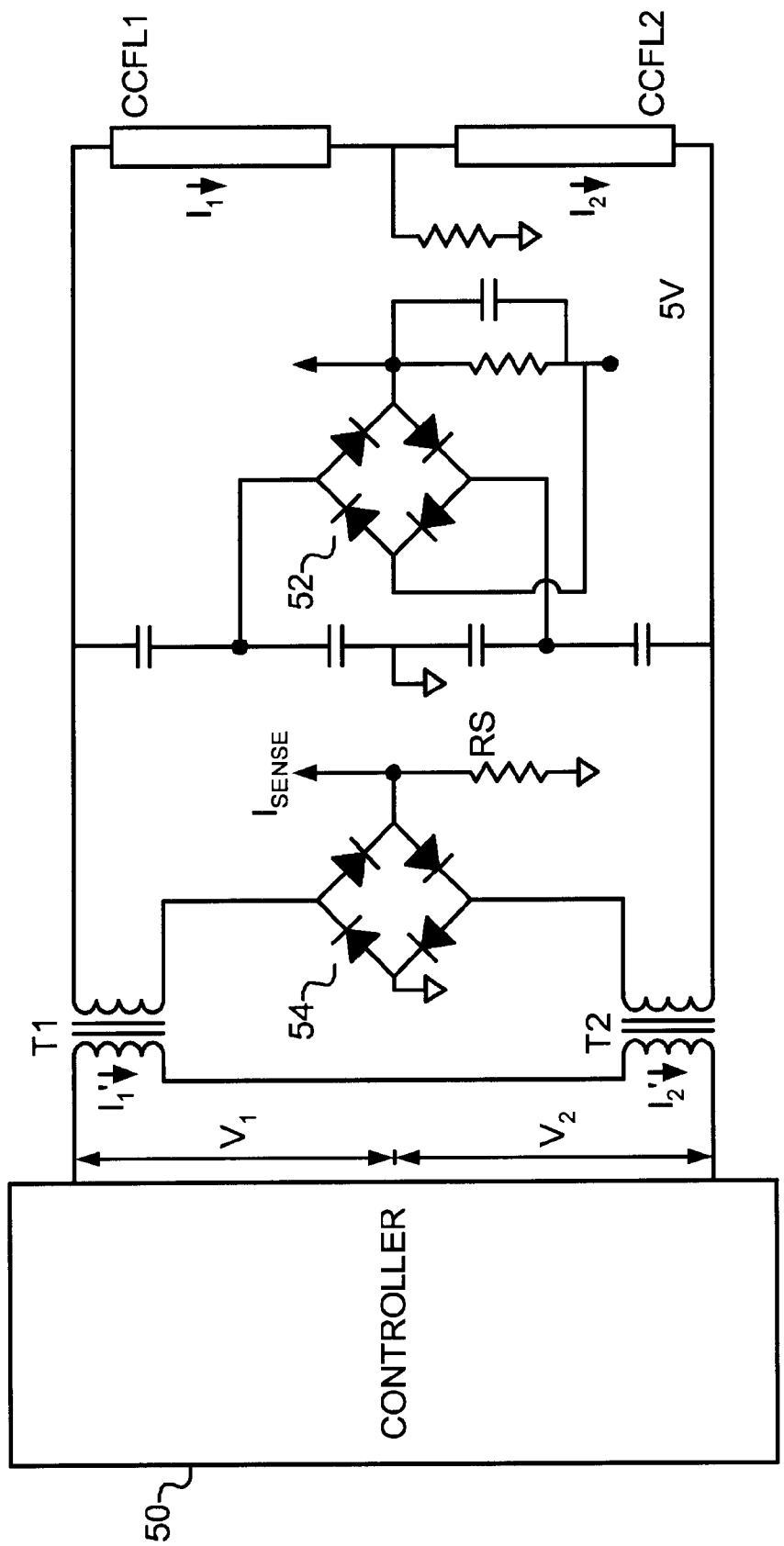
FIG. 5 is a two CCFL circuit in accordance with the present invention.

Turning to FIG. 5, a CCFL driving system of the present invention is depicted. The system generally includes a serial transformer T1, T2, a feedback controller 50, and at least two CCFT lamps. An open lamp circuit 52 includes a full bridge rectifier connected to the secondary windings in serial. A sensing circuit 54 includes a resistance Rs and a bridge rectifier coupled between the secondary windings of the transformer T1, T2.

Preferably, T1, T2 have identical transformer properties. Assuming that the currents flowing through the transformers T1, T2 are respectively I1' and I2', the voltage across the first transformer T1 is V1 and the voltage across the second transformer T2 is V2. If transformer T1 is equivalent to transformer T2, then each transformer has approximately equal voltage, namely V1 equals V2.

Further assume that the current flowing through the CCFL1 and CCFL2 are respectively I1 and I2. A current balancing resistance Rf is connected at the common node of the CCFLs and other terminal of the Rf is connected to ground. It has to be noted that the impedance of Rf is relatively high compared to the CCFLs. Preferably, the impedance of the Rf is about 1M ohm to 10M ohm. Ideally, I1 is equal to I2, but actually there is a slight difference between them. The difference in current that flows through the CCFLs is less than 1%.

If the impedance (Z1) of CCFL1 is higher than the impedance (Z2) of CCFL2, then $I1Z1 > I2Z2$.

$I1Z1 + I2Z2 = V1 + V2 = 2V1$ $I1Z1 > V1$ because that $Z1 > Z2$.

Thus, the common node voltage of the CCFLs is negative compared to ground. Under this circumstance, a balancing current is generated and flows to the common node from the ground through the current balancing resistance Rf. Finally, the balancing current results in a current that flows through the CCFL2 that is approximately equal to the one that flows through the CCFL1. Conversely, if the impedance of the CCFFL1 is lower than the CCFL2, a portion of the current at the common node will flow to ground through the Rf to obtain the benefit of current balance.

In operation, the primary windings of the transformers T1, T2 is driven and coupled to the controller. Then, the respective secondary windings are responsive to the primary windings. The secondary windings are connected to the respective lamp circuits. The current balancing resistance that is connected at the common node of multiple lamps is responsive to the potential of the common node to generate a feedback current, resulting in a current that flows through the multiple lamps that is approximately equal.

Figure 6:
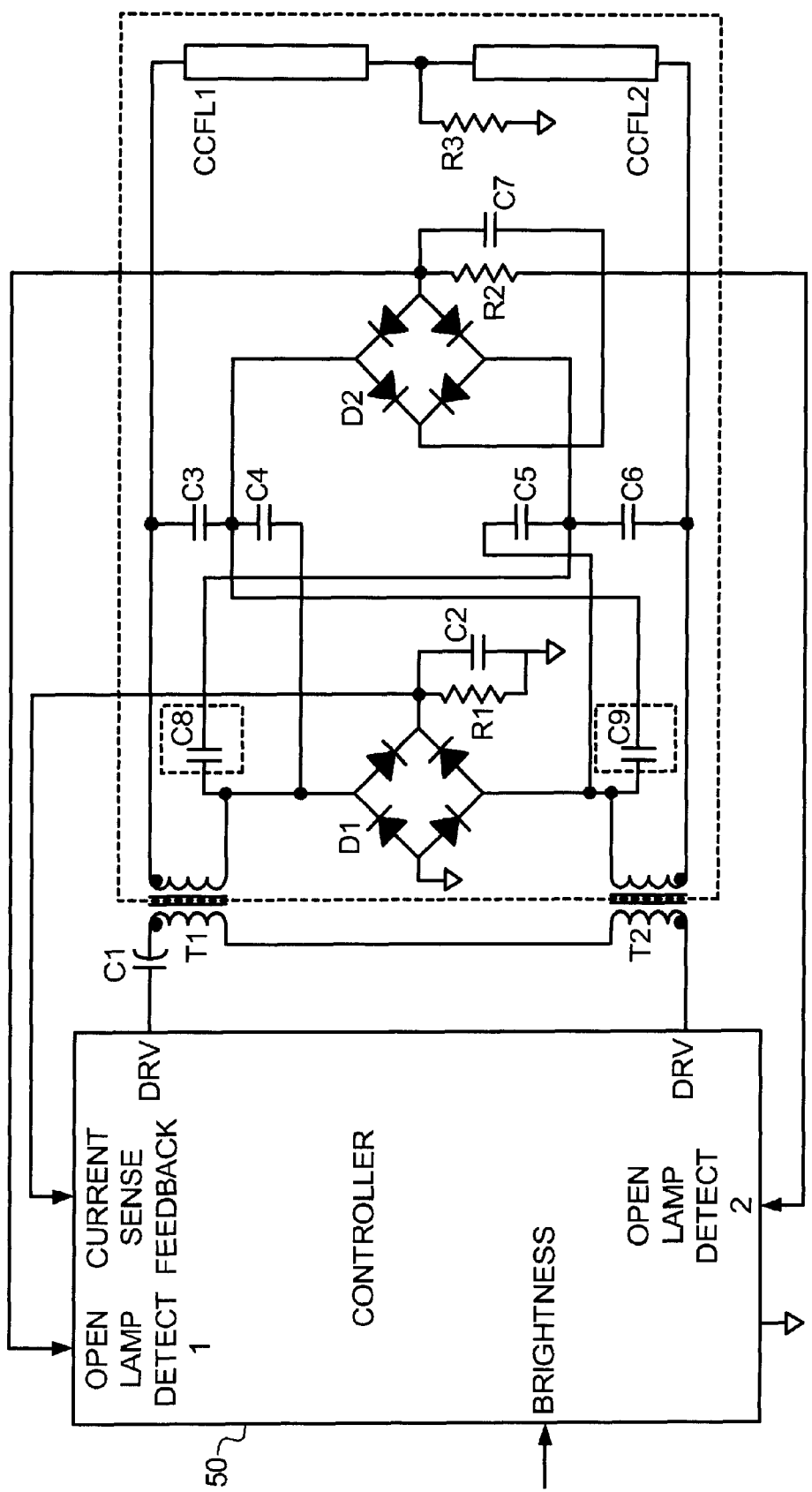
FIG. 6 is a two CCFL circuit in accordance with the present invention.

FIG. 6 illustrates a scheme for minimizing lamp current imbalance when the controller 50 is driving and maintaining the current in multiple lamps. The primary windings of the transformers are coupled to the controller 50 and the secondary windings of the transformers and the at least two lamps are configured as a series circuit.

Figure 7:
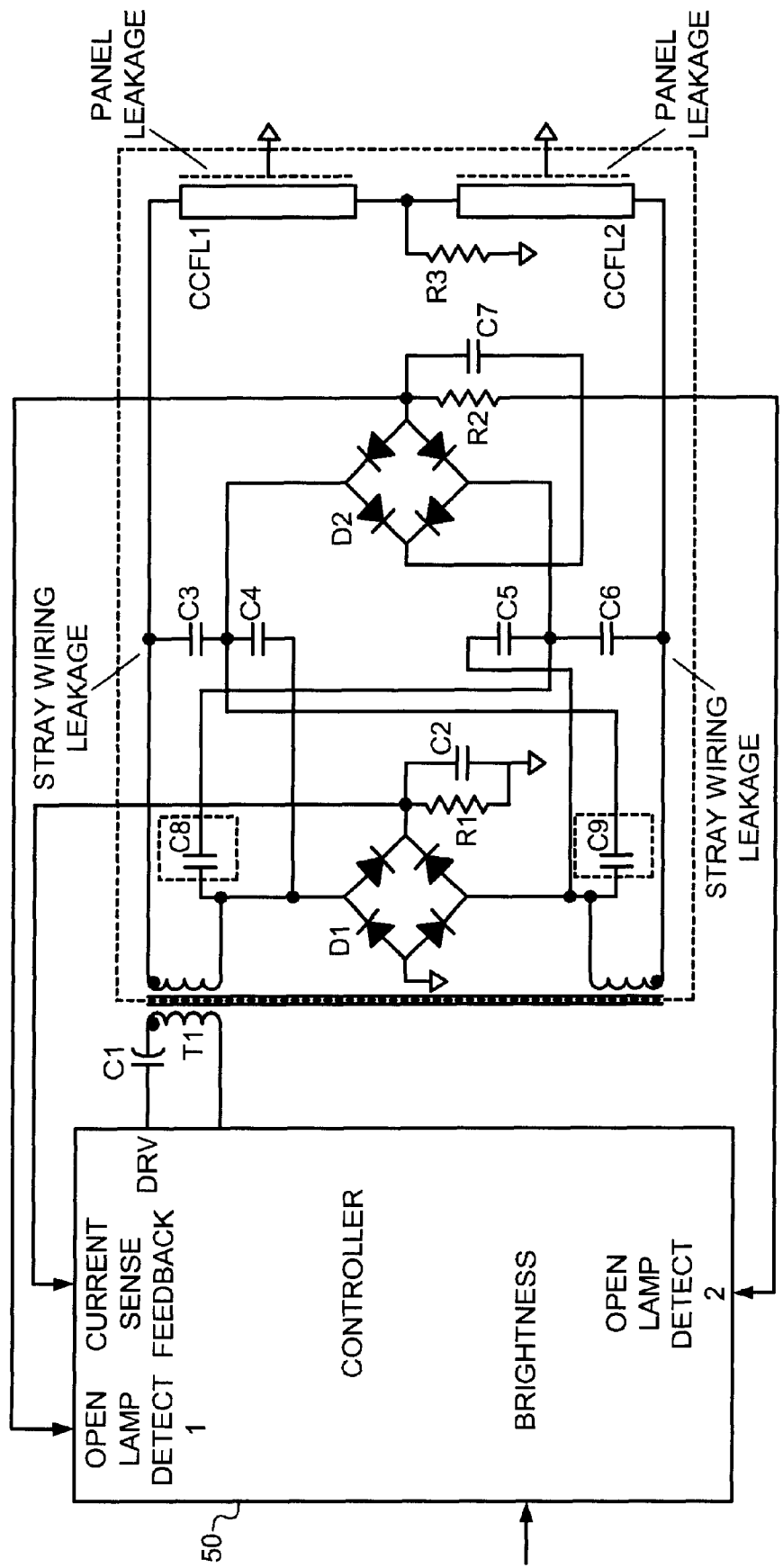
FIG. 7 is a two CCFL circuit in accordance with an alternative embodiment of the the present invention.

The scheme and method are insensitive to the transformer drive type topology which includes a single transformer with multiple, magnetically balanced secondaries, as shown in FIG. 7.

The transformers secondary windings are effectively split into two separate lamp drive circuits. A sensing circuit is inserted between and in series with the secondary windings. The transformer secondary has become a grounded center tapped push pull source for the lamps. Each sensing circuit includes a bridge rectifier D1 (or D2) and a connected resistance R1 (R2). R1 is connected to ground and R2 is coupled to a open lamp detect input of the controller 50. The lamps are connected in series with the secondary windings of the transformers (or transformer) and have a safety resistor R3 attached to the common node. Now, lacking a complete parasite path from their common node to either the circuit common or their hot ends, current must flow into the hot end of one lamp, out the safety end (common node) and directly into the other lamp. While strays still exist at and around the lamps, this direct series connection, in accordance with Kirchhoff's law forces the current to be the same in both lamps. That is to say, whatever current leaves either lamp's cold end must enter the other lamp's cold end.

It is appreciated that all manner of the primary side interface; whether monolithic, hybrid, monolithic or hybrid with external power switches and any or all combinations thereof can benefit from the invention. All known lamp dimming modulation schemes such as analog or digital is compatible with the present invention. The resonant waveforms are preferred but not required for the invention to provide lamp current balancing. Further, the present invention may be adapted to heated-cathode lamps.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A circuit comprising:

at least one transformer including primary windings and secondary windings; multiple lamps coupled in serial to said secondary windings of said at least one transformer; and a current balancing resistance connected between a common node of said multiple lamps and ground, wherein an impedance of said current balancing resistance is greater than the impedance of said multiple lamps to generate a balancing current to each of said multiple lamps.

2. The circuit of claim 1, further comprising a sensing circuit including a resistance and a bridge rectifier coupled between said secondary windings of said at least one transformer.

3. The circuit of claim 1, further comprising an open lamp circuit including a bridge rectifier connected in serial to said secondary windings.

4. The circuit of claim 1, wherein said multiple lamps include cold-cathode fluorescent lamps arranged in serial.

5. A circuit comprising:

two-lamps coupled in serial to secondary windings of a transformer; and a balancing resistance connected to a common node of said two-lamps in accordance with Kirchhoff's law to force current that leaves either lamp's cold end to enter the other lamp's cold end.

6. The circuit of claim 5, wherein an impedance of each of said balancing resistance is greater than the impedance of said two-lamps.

7. The circuit of claim 5, further comprising a sensing circuit including a resistance and a bridge rectifier coupled between said secondary windings of said one transformer.

8. The circuit of claim 6, further comprising an open lamp circuit including a bridge rectifier connected to said secondary windings in serial.

9. The circuit of claim 8, wherein said two lamps are cold-cathode fluorescent lamps arranged in serial.

10. A circuit comprising:

at least one transformer comprising primary windings and secondary windings;

multiple lamps coupled to said secondary windings of said transformer in serial; and multiple separated lamp drive circuits corresponding to said multiple lamps that are split from said at least one transformer's secondary windings; and a current balancing resistance connected between said multiple lamps and ground, wherein an impedance of said current balancing resistance is greater than the impedance of said multiple lamps to generate a balancing current to each of said multiple lamps.

11. The circuit of claim 10, further comprising a sensing circuit in series with said secondary windings.

12. The circuit of claim 11, wherein said sensing circuit includes a bridge rectifier and a connected resistance.

13. A method comprising:

driving primary windings coupled to a controller;

driving respective secondary windings connected to respective lamp circuits;

generating a feedback current by a current balancing resistance connected between a common node of multiple lamps and ground to result in a current that flows through said multiple lamps in equal amounts.

14. The method of claim 13, wherein an impedance of said current balancing resistance is greater than the impedance of said multiple lamps.

15. A method for minimizing lamp current imbalance, comprising:

providing a balancing resistance connected to a common node of two-lamps; and generating a balancing current by said balancing resistance in accordance with Kirchhoff's law to force the current that leaves either lamp's cold end to enter the other lamp's cold end.

16. The method of claim 15, wherein an impedance of said current balancing resistance is between 1–10 megaohms.

* * * * *

UNITED STATES PATENT AND TRADEMARK OFFICE
CERTIFICATE OF CORRECTION

PATENT NO.    : 6,459,216 B1
DATED         : October 1, 2002
INVENTOR(S)   : Tsai It is certified that error appears in the above-identified patent and that said Letters Patent is hereby corrected as shown below:

<u>Column 5,</u>
Lines 4-7, should be
-- at least one transformer including primary windings and
 secondary windings;
 multiple lamps coupled in serial to said secondary windings of said at least one transformer; and --;

Signed and Sealed this

Eleventh Day of February, 2003

JAMES E. ROGAN
*Director of the United States Patent and Trademark Office*